May 11, 1965 F. PAPKE 3,182,545
AIR GAP ALBADA VIEWFINDER WITH LATERAL MIRROR AND LENS ON FRONT
ELEMENT FOR VIEWING EXTERNAL INDICATOR
Filed June 7, 1960 3 Sheets-Sheet 1

INVENTOR
FRIEDRICH PAPKE

BY
Blum, Moscovitz,
Friedman & Blum
ATTORNEYS

May 11, 1965  F. PAPKE  3,182,545
AIR GAP ALBADA VIEWFINDER WITH LATERAL MIRROR AND LENS ON FRONT
ELEMENT FOR VIEWING EXTERNAL INDICATOR
Filed June 7, 1960  3 Sheets-Sheet 2

*INVENTOR*
FRIEDRICH PAPKE

BY

ATTORNEYS

May 11, 1965  F. PAPKE  3,182,545
AIR GAP ALBADA VIEWFINDER WITH LATERAL MIRROR AND LENS ON FRONT
ELEMENT FOR VIEWING EXTERNAL INDICATOR
Filed June 7, 1960  3 Sheets-Sheet 3

INVENTOR
FRIEDRICH PAPKE

BY
Blum, Moscovitz,
Friedman + Blum

ATTORNEYS 3,182,545
AIR GAP ALBADA VIEWFINDER WITH LATERAL MIRROR AND LENS ON FRONT ELEMENT FOR VIEWING EXTERNAL INDICATOR
Friedrich Papke, Braunschweig, Gliesmarode, Germany, assignor to Voigtlander A.G., Braunschweig, Germany, a corporation of Germany
Filed June 7, 1960, Ser. No. 34,533
Claims priority, application Germany, June 10, 1959, V 16,681
8 Claims. (Cl. 88—1.5)

This invention relates to "Albada" viewfinders, for photographic cameras, of the type in which the central connecting light permeable block, or central lens, is omitted, and more particularly to novel means for providing, in the field of view of such viewfinders, an indication of the position of an exposure condition indicating means of an associated photographic camera.

In the co-pending application of Friedrich Papke et al., Serial No. 33,198, filed June 1, 1960, there is shown and described novel means for providing, in an "Albada" viewfinder of the type including a central block or lens, a reflected image of the position of an exposure condition setting means of the camera. More particularly, this means comprises a bevelled or oblique surface on the front or outer lens of the viewfinder associated with a cooperating convex surface, this oblique surface carrying a mirror arranged to reflect light rays from the exposure condition indicating element of the camera through the convex surface, the central block, and the ocular and into the eye of an observer looking through the ocular.

Another known type of "Albada" viewfinder includes an outer or front lens having a semi-transparent mirror on its concave inner surface, and an ocular having a convex surface directed toward such front lens and carrying a picture limiting frame thereon. The ocular is separated from the front lens a substantial distance axially of the viewfinder, the ocular and the front lens being mounted in an enclosure which defines an air space occupying all or substantially all of the distance between the ocular and the front lens. In other words, in this type of "Albada" viewfinder, the light permeable central block or lens, or at least the portion thereof between a pair of surfaces lying in diametric planes, is omitted and replaced by an enclosed air space.

The present invention is directed to novel means for incorporating, in this latter type of "Albada" viewfinder, means for providing, in the field of view of the viewfinder, a reflected image of the position of an exposure condition indicating element of the camera, and without requiring any parts additional to the "Albada" viewfinder except a reflecting mirror which is arranged on an oblique surface formed on the front lens and directing light rays from such element through means forming an optical surface, preferably a convex surface acting as a positive lens. Consequently, only one element of the "Albada" viefinder, namely the outer lens need be re-shaped or re-dimensioned.

For an understanding of the principles of the invention, reference is made to the following description of typical embodiments thereof as illustrated in the accompanying drawing. In the drawing.

Figure 1:
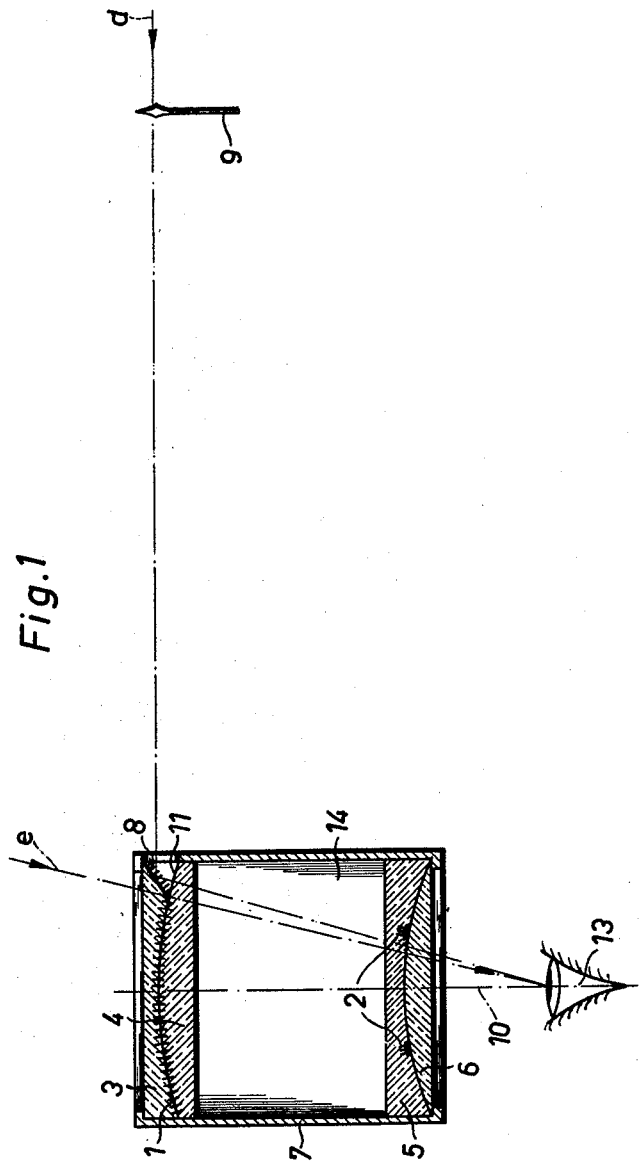
FIG. 1 is an axial sectional view through an "Albada" viewfinder of the type including an air space intermediate the front lens and the ocular, the novel means of the present invention being shown as incorporated therein, and the viewfinder having an enlargement ratio of 1:1.

Referring to FIG. 1, an "Albada" type viewfinder is illustrated as comprising a semi-transparent mirror 1 arranged to focus, at infinity, a picture limiting frame 2. Mirror 1 is disposed between the concave inner surface of a plano-concave front lens 3 and the convex surface of a plano-convex optical member 4, these two surfaces being cemented together with the mirror 2 therebetween. Similarly, the picture limiting frame 2 is disposed between the concave surface of a plano-concave optical element 5 and the convex surface of an ocular 6, these two surfaces also being cemented together. The cementing together of elements 3 and 4, together with the cementing together of the elements 5 and 6, forms two composite optical elements which are spaced a substantial distance axially from each other and disposed within a housing 7, whereby a substantially cylindrical air space 14 is formed between the two composite optical members. It will be noted that the composite elements have plane surfaces facing each other.

In accordance with the invention, an oblique surface 8 is formed on the front lens 3 and extends at an angle to the optical axis 10 of the viewfinder. This surface is mirrored to reflect a light ray $d$, from a pointer 9 of an exposure meter, for example, onto a convex optical surface portion 11 of member 4 disposed in operative relation with the bevelled or oblique surface 8. Ray $d$ illuminates the pointer 9 and enters the viewfinder at substantially a right angle to the optical axis 10 thereof, and is so reflected by mirror 8 through surface 11 that it extends in approximately the direction $e$ of the path of light rays entering the viewfinder.

The present invention is based upon the following principles. The beam of light rays from the indicating element of the camera, such as the pointer 9, must be deflected into the eye 13 of the observer. As the image of pointer 9 must appear in the picture field of the viewfinder, it must therefore be focused approximately at infinity by the viewfinder. To effect this, it is necessary that the reflected light ray pass through a lens.

In the embodiment of the invention shown in FIG. 1, the light ray is reflected from the mirrored oblique surface through the convex optical surface 11, which effects the required lens action thereon. The focal length of this convex surface 11 must be so selected that the distance of pointer 9 from the optically active spherical surface 11 is equal to the focal length of the lens formed by surface 11. The proper dimensions can be derived by known geometric optics. Since, in the embodiment shown in FIG. 1, the convex surface 11 corresponds to those required for the "Albada" viewfinder, in that its radius of curvature is equal to that of the semi-transparent or partially permeable mirror 1, the conditions for focusing of the reflected image of the pointer at infinity are obtained. Consequently, the pointer 9 appears to the observer at eye 13 in the same manner as does the reflected image or picture field bordering frame 2; that is, as a virtual image appearing to lie in the image space.

Figure 2:
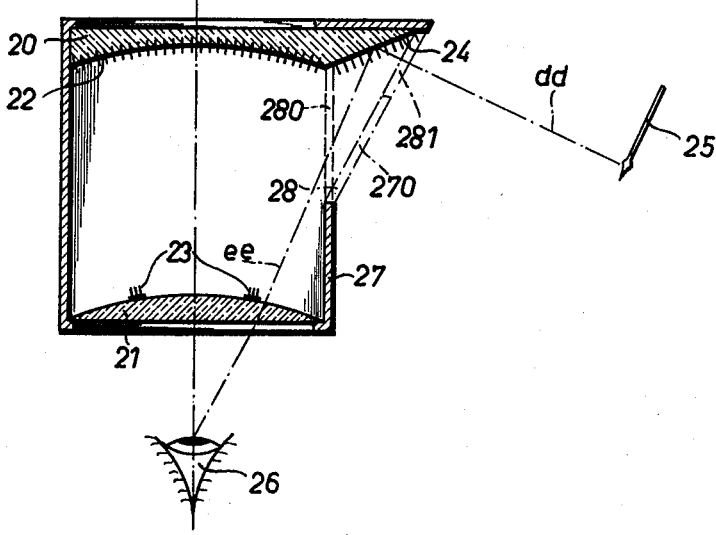
FIG. 2 is a view, similar to FIG. 1, illustrating the invention as incorporated in an "Albada" viewfinder having an image reducing effect.

In an equally simple manner, the proper focusing of the image of a pointer or the like can be effected with an "Albada" viewfinder of the type shown in FIG. 2, and which has a reducing effect on the image rather than having a 1:1 ratio. The plano-concave lens 20 in combination with the plano-convex ocular 21, axially separated substantially from each other so that there is an air space therebetween within the enclosure 27, form, in a known manner, an "Albada" viewfinder of the "Newton" type. The usual semi-transparent partially permeable mirror is formed or cemented on the concave surface 22 of front lens 20, being formed in any desired manner such as by vacuum deposition of metal or by securing an actual mirror to this surface. This partially permeable mirror reflects at infinity the picture limiting frame 23, which is cemented on the convex surface of ocular 21. There is also formed on the front element 20 an oblique surface 24, provided with a mirror, which reflects the image of an exposure condition indicating element of the camera, such as the pointer 25 of an exposure meter, into the path of light rays entering through the viewfinder.

In the embodiment shown in FIG. 2, a preferred arrangement is shown which is not absolutely essential to the present invention. In order to utilize fully the entire field of the mirror on the surface 22, and thus not reduce this field by a marginal cut-out for the application of the oblique mirror, as in the embodiment of FIG. 1, front lens 20 is extended sufficiently far laterally so that the oblique mirrored surface 24 does not reduce, or at least does not substantially reduce, the field of the partially permeable or semi-transparent mirror on the concave surface 22, and which has the primary function of reflecting the picture limiting frame 23. The distance from pointer 25 through the mirrored surface 24 to the convex surface of ocular 21 is so dimensioned that it is equal to the focal length of ocular 21. Also, the refractive power of ocular 21 is so selected that, in cooperation with the distance of pointer 25 from the convex surface of ocular 21, the image of pointer 25 is focused at infinity to provide a virtual image which appears, to the eye 26 of an observer, to be lying in the picture space. The optical conditions can be fulfilled, using known rules and laws of geometrical optics, without invention.

Housing 27 is provided with a cut-out 28 so that the reflected ray *ee* can pass without interference from the mirrored surface 24 into the viewfinder space. If desired, opening 28 can be closed by a glass pane or the like, as indicated in broken lines at 280. However, housing 27 could be provided at this portion with a lateral bulge or an oblique attached structure, such as shown in dotted lines at 270. Such attached structure preferably would extend from the outer edge of the oblique mirrored surface 24, as indicated in dotted lines. This offset or attached structure 270 either could be entirely of glass or could be provided with an opening 281 for the reflected ray *dd*, this opening being preferably covered by a glass pane in order to prevent the entrance of dust.

Figure 3:
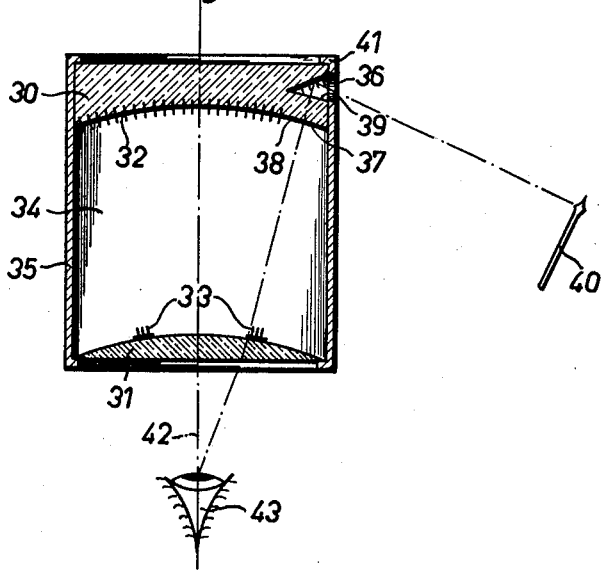
FIG. 3 is a view, similar to FIG. 2, but illustrating a different optical construction of the viewfinder.

FIG. 3 illustrates an embodiment of the invention providing a reduced image of the reflected indicating element. Referring to this figure, a plano-concave front lens 30 is separated a substantial distance axially from the plano-convex ocular 31, the concave surface of lens 30 carrying the semi-permeable or semi-transparent mirror 32 arranged to focus, at infinity, a picture limiting frame 33 cemented on the convex surface of ocular 31. An air space 34 between front lens 30 and ocular 31 is defined by the housing 35 mounting the front lens and the ocular.

In the same manner as previously described, the oblique mirrored surface 36 is formed on the front lens 30. However, in this embodiment of the invention, there is a special development of the front lens. This lens contains, as a separate functional entity, a lens member 37 having a concave surface 38 facing the eye 43 and preferably having the same radius of curvature as the semi-transparent mirror 32. However, the convex optical surface 39 of lens member 37, facing the oblique mirrored surface 36, has a smaller radius of curvature than does the surface 38, so that lens member 37 is, in effect, a positive miniscus-shaped lens. This lens member 37 reinforces the optical action of the ocular lens 31 and cooperates therewith in providing the image of the element, such as the pointer 40.

The advantage of this construction is that, by a proper selection of the curvature of the surface 39, there can be obtained a greater latitude in selection of the distance between the element 40, whose image is to be reflected, and the viewfinder. Also, with the lens member 37 acting as a positive lens, variations in the size of the reflected image of pointer 40 may be readily obtained.

The concave surface of front lens 30 can be kept unmirrored on the surface portion 38, or surface 38 may be provided with a partially permeable or semi-transparent mirror. In the latter case, there will be no pupillary division of the picture limiting frame 33 reflected by the mirror, with respect to the reflected image of pointer 40.

It is within the scope of the invention that the convex surface 39 of lens member 37 can have a curvature different from that illustrated in FIG. 3. For example, surface 39 may be flat or, in a special case, can be even more convex or less convex than shown, depending upon whether the relative dimensions of the camera indicate a reducing or enlarging action of the lens element. A negative lens member, cooperating with the ocular lens 31, would form a "Brugge" magnifying glass. This type of magnifying glass can also provide similar reflecting properties.

It should further be noted, with respect to the embodiment of FIG. 3, that it is preferable that the oblique mirorred surface 36 does not have its outer edge terminating at the plane outer surface of the lens 30, but rather inwardly therefrom. While this is the preferred construction, the oblique mirrored surface 36 may terminate at the plane outer surface of lens 30, for example at the corner 41 of the housing 35. In the embodiment shown in FIG. 3, the optical axis is indicated at 42 and the eye of the observer at 43.

The front lens 30, which is complicated per se, cannot readily be produced with the lens member 37 in a single piece of glass without considerable difficulty. However, by modern plastic technology, an optical body of this type can be made readily, in a single piece, from plastic. In any particular case, it may be necessary, for optical as well as manufacturing reasons, to machine the lens portion or member 37 separately. In such case, it would be desirable to produce lens member 37 as an independent part which is combined with lens 30 by cementing thereto, for example.

Figure 4:
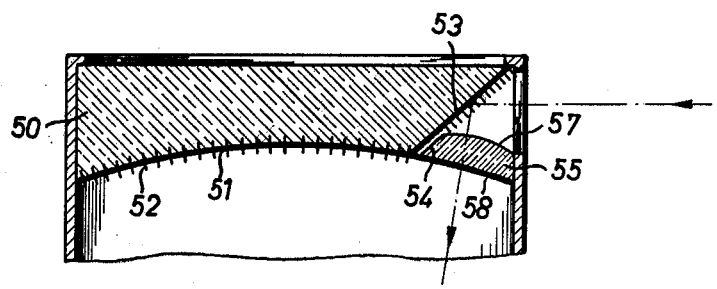
FIG. 4 is a partial axial sectional view of a modified form of the viewfinder illustrated in FIG. 3, showing only the front lens and associated parts.

FIG. 4 shows, in a partial axial sectional view, how the front lens and the lens member can be made as separate elements. Referring to this figure, the separately formed front lens 50 has the partially permeable or semi-transparent mirror 52 on its concave surface 51, and is formed with the oblique mirrored surface 53. On the oblique surface portion of lens 50, there is cemented an additional lens 55 having an oblique surface 54 cemented against the oblique surface of lens 50. The surface 57 of lens member 55 is convex to an extent to assure proper focussing of the pointer or other element, whereas the surface 58 can be either flat or concave to the same curvature as the surface 51 of the front lens 50. The latter case is illustrated in FIG. 4.

In the embodiment of the invention illustrated in FIG. 4, machining of the surfaces 51 and 58 is effected after the parts have been cemented together, to assure that they have the same curvature. The partially permeable, or semi-transparent, mirror 52 can be extended over the surface 58 so as to avoid a pupillary division of the reflection of the pointer, on the one hand, and of the picture limiting frame on the other hand. It has been observed, in practice, that epoxide resins and ethoxylene resins, used as cement, provide dependable connections between the two elements of the front lens.

Figure 5:
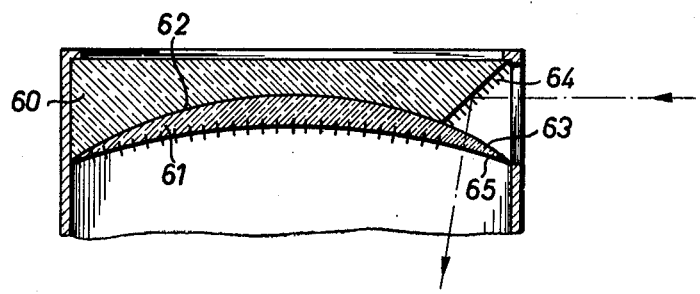
FIG. 5 is a view, similar to FIG. 4, illustrating a further embodiment of the invention.

FIG. 5 illustrates a further embodiment of the invention by means of which the front lens can be made of glass using known optical production methods. In this instance, the front lens 60 is again a plano-concave lens having attached thereto, along its concave surface 62, a miniscus or concave-convex lens 61. While the cemented juncture of the element 60 and 61 does not produce any special optical effects, the portion 63 of the convex surface of the miniscus lens 61 extending adjacent an oblique mirrored surface 64 on element 60, provides the optical surface required for proper reflection of the image of the indicating element of the camera into the field of view of the viewfinder. In this embodiment of the invention, the partially permeable or semi-transparent mirror is preferably applied only to that portion of the concave surface of lens 61 co-extensive with that portion of the convex surface thereof cemented to the concave surface 62 of member 60. However, if the semi-permeable or semi-transparent mirror is extended over the entire concave surface 65 of the lens 61, there will be no pupillary division with respect to the reflected images of the pointer and the picture limiting frame. The concave surface 62 of member 60 need only be milled, pressed, or similarly rough worked, if the cement used to secure the parts 60 and 61 together has the same index of refraction as the glass used to form the body 60.

While specific embodiments of the invention have been shown and described in detail to illustrate the application of the invention principles, it will be understood that the invention may be embodied otherwise without departing from such principles.

What is claimed is:

1. In an Albada viewfinder, for photographic cameras, of the type comprising a laterally substantially light impermeable housing having open front and rear ends, a front object facing lens mounted in the front end of said housing and having a rearwardly facing concave surface carrying a semi-transparent mirror, and an ocular mounted in the rear end of said housing and having a convex surface facing said concave surface and carrying a picture limiting frame for imaging by said mirror at substantially infinity, said front lens and said ocular being separated by an air gap having an axial length such that said frame is substantially in the focal plane of said mirror: means for providing, in the field of view of an observer looking through the ocular, an image of the position of an exposure condition indicating element of the camera located extraneous to the viewfinder, said means comprising a mirrored laterally and inwardly facing substantially plane surface of said front lens oblique to the optical axis of the viewfinder adjacent the lateral wall of said housing and in the path of light rays imaging said element and entering the housing unimpeded through a lateral opening therein adjacent said oblique mirrored surface for reflection by the latter toward said ocular; and transparent means providing a convex surface area adjacent and facing said oblique mirrored surface, forming an open substantially V-shaped groove with said mirrored surface, and situated in the path of light rays reflected from the latter toward said ocular, said convex surface area, due to its light ray converging action, providing, in the field of view of a viewer looking into the viewfinder through said ocular and along the optical axis of the viewfinder, a sharply focused image of said element in addition to the sharply focused image of the subject to be photographed and of said picture limiting frame, said oblique mirrored surface extending to the concave surface of said front lens and including a non-mirrored surface portion cemented to a mating surface portion of said means providing said convex surface area.

2. A combination as claimed in claim 1 in which the focal length of said convex surface area is equal to the light ray distance from the indicating element, whose position is to be reflected, to the point of incidence of the light rays therefrom on such convex surface area.

3. A combination as claimed in claim 1 in which said convex surface has an optical axis eccentric to the light ray path from the mirrored oblique surface to the ocular.

4. A combination as claimed in claim 1 in which said non-mirrored surface portion extends to the concave surface of the front lens, said means providing said convex surface area being adjacent the concave surface of the front lens and having said convex surface area facing said oblique mirrored surface.

5. A combination as claimed in claim 4 in which the surface of said last-named means facing the ocular is concave to the same curvature as the concave surface of the front lens and constitutes, in effect, a continuation thereof.

6. A combination as claimed in claim 1, in which said convex surface area is formed by the front surface of a lens mounted adjacent said oblique mirrored surface and secured to said front object facing lens by cementing.

7. A combination as claimed in claim 1, in which said convex surface area is formed by the front surface of a lens mounted adjacent said oblique mirrored surface and secured to said housing.

8. A combination as claimed in claim 1, in which said convex surface area is formed by the front surface of a lens mounted adjacent said oblique mirrored surface and positioned between a lateral edge of said front object facing lens and a lateral wall of said housing.

References Cited by the Examiner
UNITED STATES PATENTS

| | | | |
|---|---|---|---|
| 2,197,939 | 4/40 | Leitz. | |
| 2,975,685 | 3/61 | Fegert | 95—10 |
| 2,996,964 | 8/61 | Fischer et al. | 95—10 |
| 3,006,262 | 10/61 | MacMillin | 88—1.5 X |
| 3,016,811 | 1/62 | Bundschuh et al. | |
| 3,031,940 | 5/62 | Wilson. | |
| 3,043,180 | 7/62 | Papke | 88—1.5 |

FOREIGN PATENTS

| | | |
|---|---|---|
| 202,442 | 3/59 | Austria. |
| 547,192 | 3/32 | Germany. |
| 648,955 | 8/37 | Germany. |
| 842,154 | 6/52 | Germany. |
| 855,944 | 11/52 | Germany. |
| 547,045 | 8/42 | Great Britain. |

DAVID H. RUBIN, *Primary Examiner.*

EMIL G. ANDERSON, *Examiner.*